United States Patent
Rolfes et al.

(10) Patent No.: US 9,399,510 B2
(45) Date of Patent: *Jul. 26, 2016

(54) HAT STRINGER CLOSEOUT FITTING AND METHOD OF MAKING SAME

(71) Applicant: The Boeing Company, Huntington Beach, CA (US)

(72) Inventors: Corey A. Rolfes, Everett, WA (US); Jeffrey F. Stulc, Seattle, WA (US)

(73) Assignee: The Boeing Company, Chicago, IL (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/464,098

(22) Filed: Aug. 20, 2014

(65) Prior Publication Data

US 2016/0052617 A1 Feb. 25, 2016

(51) Int. Cl.
| | |
|---|---|
| *B64C 3/00* | (2006.01) |
| *B64C 3/18* | (2006.01) |
| *B64C 3/34* | (2006.01) |
| *B64D 37/00* | (2006.01) |
| *B64D 37/04* | (2006.01) |
| *B64D 37/10* | (2006.01) |

(52) U.S. Cl.
CPC . *B64C 3/182* (2013.01); *B64C 3/34* (2013.01); *B64D 37/005* (2013.01); *B64D 37/04* (2013.01); *B64D 37/10* (2013.01)

(58) Field of Classification Search
None
See application file for complete search history.

(56) References Cited

U.S. PATENT DOCUMENTS

| | | | | |
|---|---|---|---|---|
| 3,878,356 A | * | 4/1975 | Roye | B21J 15/08 219/118 |
| 4,645,244 A | * | 2/1987 | Curtis | F16L 27/0857 285/114 |
| 4,802,642 A | * | 2/1989 | Mangiarotty | B64C 23/00 244/130 |
| 5,263,747 A | * | 11/1993 | Lefebvre | F16L 25/0036 285/226 |

(Continued)

FOREIGN PATENT DOCUMENTS

| | | |
|---|---|---|
| FR | 2922517 A1 | 4/2009 |
| WO | 2012101439 A1 | 8/2012 |

OTHER PUBLICATIONS

U.S. Appl. No. 14/249,735, filed Apr. 10, 2014, entitled Vent Stringer Fitting.

(Continued)

*Primary Examiner* — Medhat Badawi
(74) *Attorney, Agent, or Firm* — Armstrong Teasdale LLP

(57) ABSTRACT

A closeout fitting for a hat stringer includes a cover that has a fitting surface. The fitting surface is substantially complementary to at least a portion of an outer surface of the hat stringer. The cover is configured to couple against the hat stringer outer surface. The cover also includes a first portion configured to extend across a gap defined in a cap portion of the hat stringer. The closeout fitting also includes an insert. The insert includes a first outer perimeter surface that is substantially complementary to at least a portion of an interior surface of a channel defined by the hat stringer. The insert is configured to couple against the channel interior surface proximate the hat stringer closeout portion. The insert and the cover are formed with a suitable stiffness to limit a deformation of the hat stringer proximate the closeout portion.

17 Claims, 5 Drawing Sheets

(56) References Cited

U.S. PATENT DOCUMENTS

| | | | | |
|---|---|---|---|---|
| 5,370,427 A * | 12/1994 | Hoelle | F16L 27/026 | 285/226 |
| 6,315,332 B1 * | 11/2001 | Aschoff | F16L 27/11 | 285/226 |
| 6,458,309 B1 * | 10/2002 | Allen | B29C 70/446 | 156/197 |
| 7,040,666 B2 * | 5/2006 | Christianson | F02K 1/80 | 285/145.5 |
| D551,336 S * | 9/2007 | Haggkvist | D23/386 | |
| 8,167,245 B1 * | 5/2012 | Koehler | B64C 3/34 | 244/123.1 |
| 8,408,493 B2 * | 4/2013 | Barnard | B64C 1/064 | 244/119 |
| 8,776,351 B2 * | 7/2014 | Bird | F16L 21/022 | 277/603 |
| 9,010,689 B1 * | 4/2015 | Brook | B64D 37/32 | 244/135 R |
| 2003/0164623 A1 * | 9/2003 | Yoshida | B62D 25/2036 | 296/30 |
| 2006/0060705 A1 * | 3/2006 | Stulc | B64C 1/069 | 244/119 |
| 2006/0152070 A1 * | 7/2006 | Doud | B60B 35/003 | 301/137 |
| 2008/0023585 A1 * | 1/2008 | Kordel | B64C 3/00 | 244/123.5 |
| 2008/0111024 A1 * | 5/2008 | Lee | B64C 1/068 | 244/121 |
| 2008/0128554 A1 * | 6/2008 | Pham | B64C 3/26 | 244/131 |
| 2008/0169641 A1 * | 7/2008 | Santa Cruz | F16L 41/02 | 285/5 |
| 2008/0302912 A1 * | 12/2008 | Yip | B29C 43/10 | 244/119 |
| 2008/0302915 A1 * | 12/2008 | Yip | B29C 70/342 | 244/132 |
| 2009/0060675 A1 * | 3/2009 | Yustick | F16B 19/02 | 411/339 |
| 2009/0072088 A1 * | 3/2009 | Ashton | B64C 3/185 | 244/124 |
| 2009/0127393 A1 * | 5/2009 | Guzman | B29C 44/583 | 244/133 |
| 2009/0184200 A1 * | 7/2009 | Lin | B64C 1/26 | 244/1 N |
| 2009/0266936 A1 * | 10/2009 | Fernandez | B64C 1/061 | 244/119 |
| 2010/0139850 A1 * | 6/2010 | Morris | B29C 33/485 | 156/242 |
| 2010/0139857 A1 * | 6/2010 | Pham | B29C 33/485 | 156/286 |
| 2010/0304094 A1 * | 12/2010 | Brook | B29C 70/222 | 428/174 |
| 2011/0027526 A1 * | 2/2011 | McCarville | B29C 70/30 | 428/116 |
| 2011/0073155 A1 * | 3/2011 | Sillmann | F24J 2/5203 | 136/244 |
| 2012/0024418 A1 * | 2/2012 | French | B64D 37/005 | 141/1 |
| 2012/0024468 A1 * | 2/2012 | Chaume | B29C 70/345 | 156/243 |
| 2012/0040169 A1 * | 2/2012 | Boursier | B32B 5/022 | 428/223 |
| 2012/0069432 A1 * | 3/2012 | Liang | G02B 7/14 | 359/401 |
| 2012/0222800 A1 * | 9/2012 | Reinhardt | B29C 31/008 | 156/182 |
| 2012/0241560 A1 * | 9/2012 | Erickson | B64D 37/06 | 244/131 |
| 2012/0312612 A1 * | 12/2012 | Harrison, III | B60K 1/04 | 180/68.5 |
| 2013/0049258 A1 * | 2/2013 | Rotter | B29C 70/462 | 264/255 |
| 2013/0118624 A1 * | 5/2013 | Burnickas | F16K 11/02 | 137/876 |
| 2013/0133171 A1 * | 5/2013 | Miguez Charines | B29C 70/42 | 29/428 |
| 2013/0181092 A1 * | 7/2013 | Cacciaguerra | B64C 1/068 | 244/131 |
| 2013/0240126 A1 * | 9/2013 | Reinhardt | B29C 65/562 | 156/182 |
| 2013/0264421 A1 * | 10/2013 | Firko | B29D 99/0003 | 244/117 R |
| 2013/0302172 A1 * | 11/2013 | Williams | B64C 3/22 | 416/227 R |
| 2013/0316147 A1 * | 11/2013 | Douglas | B64C 3/182 | 428/172 |
| 2013/0327477 A1 * | 12/2013 | Hollensteiner | B29C 70/446 | 156/245 |
| 2013/0344291 A1 * | 12/2013 | Pearson | B29C 70/865 | 428/157 |
| 2014/0099477 A1 * | 4/2014 | Matsen | B29C 70/34 | 428/166 |
| 2014/0196289 A1 * | 7/2014 | Hollingshead | B64F 5/0009 | 29/897.2 |
| 2014/0208931 A1 * | 7/2014 | Shmargad | F41H 7/042 | 89/36.08 |
| 2014/0209745 A1 * | 7/2014 | Hosokawa | B64C 3/26 | 244/123.1 |
| 2014/0248140 A1 * | 9/2014 | Jacques | F01D 5/303 | 415/183 |
| 2014/0262614 A1 * | 9/2014 | Rushin | B65D 11/10 | 182/48 |
| 2014/0272312 A1 * | 9/2014 | Sammons | B32B 7/12 | 428/172 |
| 2014/0284426 A1 * | 9/2014 | Erickson | B64C 1/06 | 244/135 R |
| 2014/0299713 A1 * | 10/2014 | Komoda | B64C 3/26 | 244/123.1 |
| 2014/0332637 A1 * | 11/2014 | Buttars | F16L 3/08 | 248/56 |
| 2015/0041589 A1 * | 2/2015 | Hasan | B64C 1/26 | 244/119 |
| 2015/0059142 A1 * | 3/2015 | De Jong | B29C 73/10 | 29/402.14 |
| 2015/0091263 A1 * | 4/2015 | Lewis | A63C 17/06 | 280/11.223 |
| 2015/0217852 A1 * | 8/2015 | Sanderson | B64C 3/10 | 244/123.7 |
| 2015/0251706 A1 * | 9/2015 | Stojkovic | B62D 27/065 | 403/34 |
| 2015/0252824 A1 * | 9/2015 | Benthien | F16B 2/02 | 248/205.3 |
| 2015/0336656 A1 * | 11/2015 | Rolfes | B64C 3/34 | 244/123.1 |

OTHER PUBLICATIONS

Extended European Search Report, dated Jan. 4, 2016, for co-pending EP patent application No. EP 15175417.3 (8 pgs.).

* cited by examiner

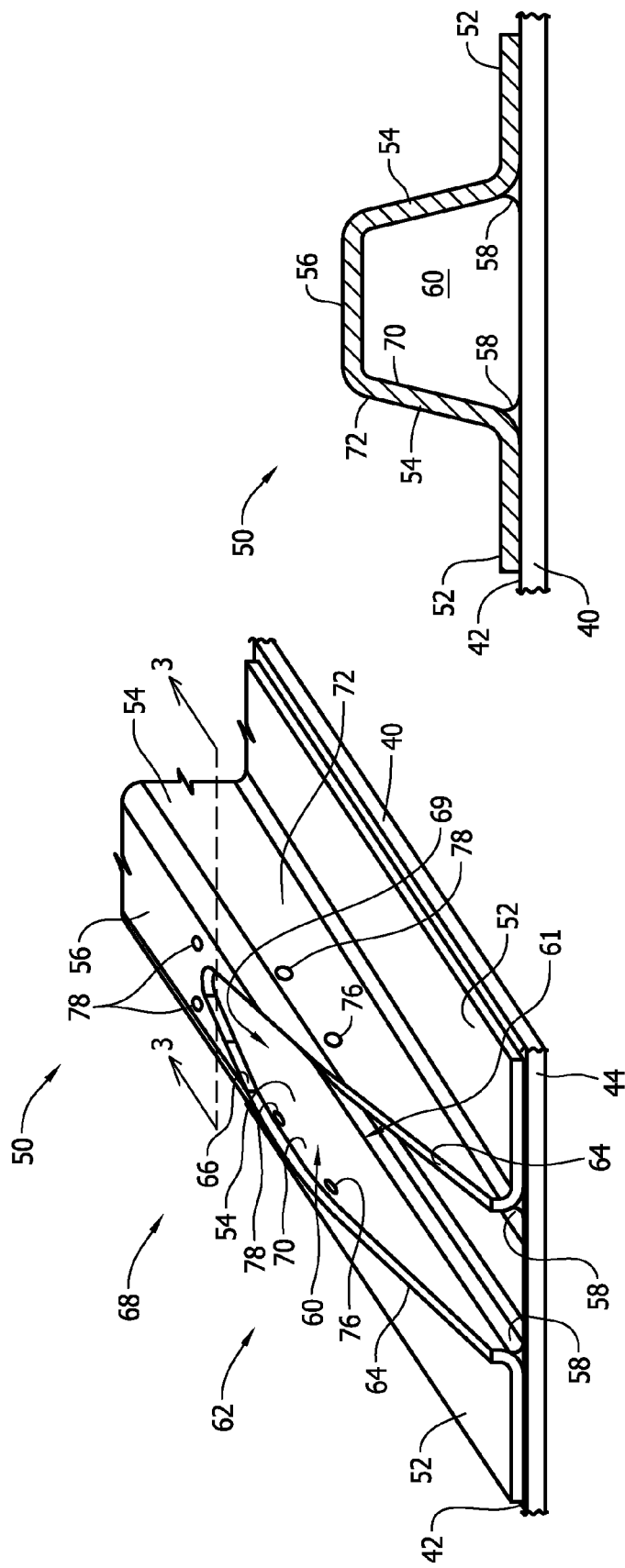

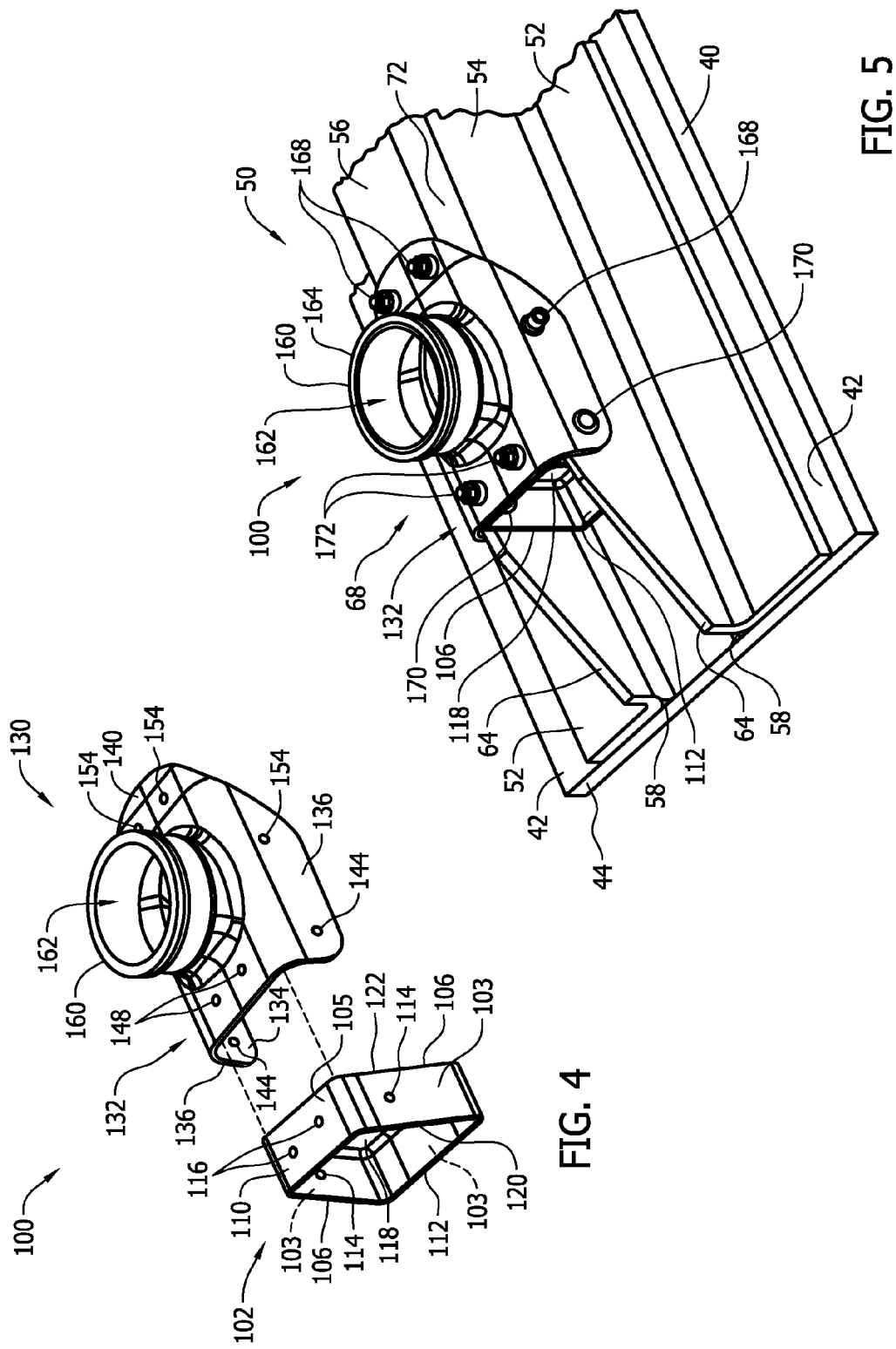

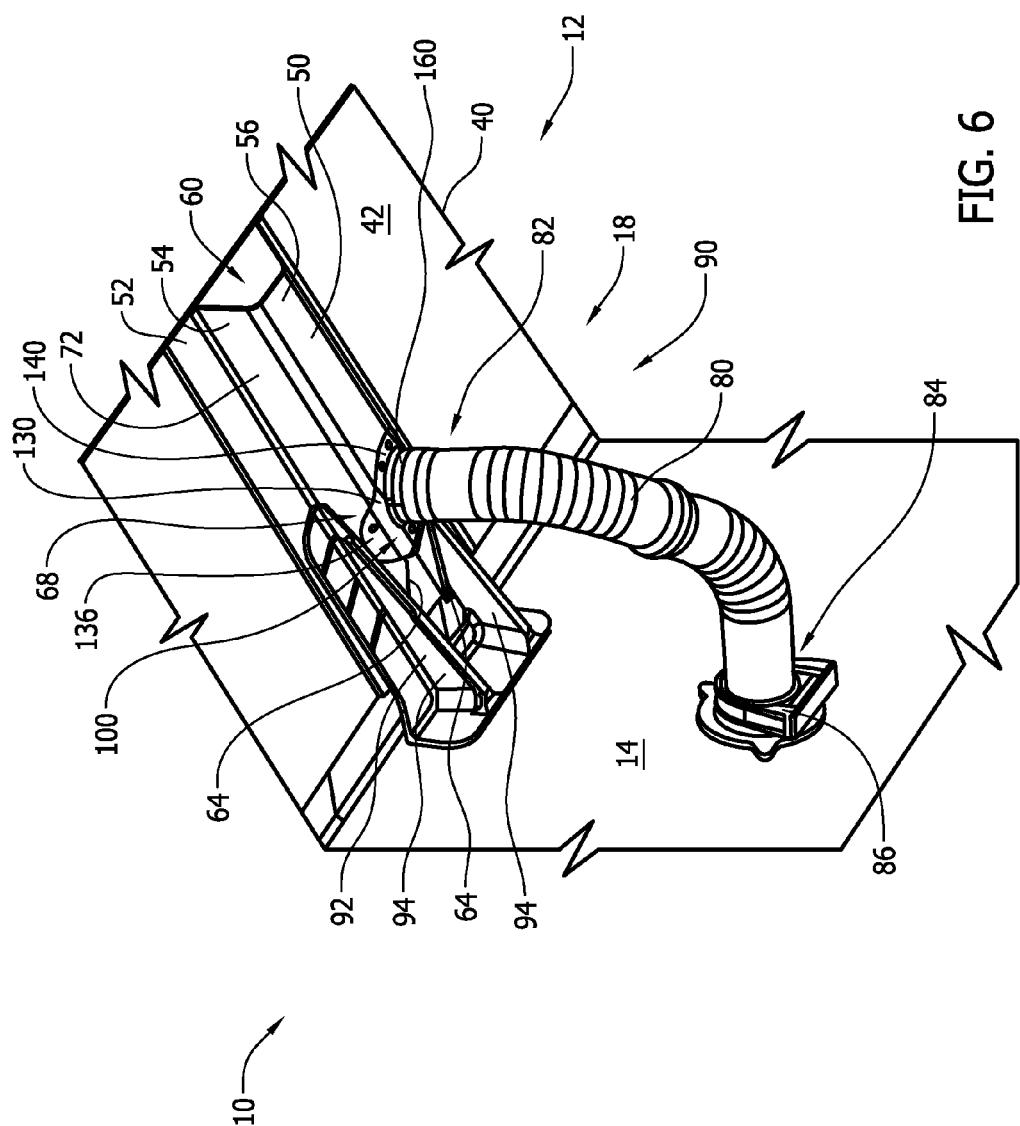

HAT STRINGER CLOSEOUT FITTING AND METHOD OF MAKING SAME

BACKGROUND

The field of the disclosure relates generally to hat stringer fittings, and, more particularly, to a closeout fitting for a hat stringer that includes a trimmed end.

At least some known structures, such as aircraft, include structural components that are stiffened with hat stringers. At least some such hat stringers are trimmed proximate an end of the hat stringer, sometimes referred to as a "run-out" trim. For example, a run-out trim may be necessary to accommodate a structural joint fitting with another structural component. However, such a run-out trim may decrease a capability of at least some known hat stringers to carry certain loads to which the hat stringer may be subjected, such as, but not limited to, torsional loads on the hat stringer and shear loads in a cap of the hat stringer. As a result, adverse effects, such as, but not limited to, excessive hat stringer web bending and excessive localized loads on the hat stringer noodle, such as bending, torsion, shear, axial, vertical, and/or transverse localized noodle loads, may cause a crack or delamination near the run-out trim location.

Moreover, at least some known structural components include hat stringers that additionally or alternatively provide a vent path for a fluid, such as but not limited to an aircraft fuel and/or fuel vapor, associated with the structural component. To accommodate a vent system connection, an additional hole must be drilled through at least some such hat stringers at a location away from the run-out trim. However, such an additional hole may decrease a structural integrity of at least some known hat stringers. In addition, for at least some known hat stringers, a number of tasks must be performed to seal the vent path proximate a run-out trim as part of a larger process of coupling the structural component, for example an aircraft wing, to another structural component, for example an aircraft fuselage. Thus a time and a cost of the larger process is increased.

BRIEF DESCRIPTION

In one aspect, a closeout fitting for a hat stringer is provided. The closeout fitting includes a cover that has a fitting surface. The fitting surface is substantially complementary to at least a portion of an outer surface of the hat stringer. The cover is configured to couple against the hat stringer outer surface. The cover also includes a first portion configured to extend across a gap defined in a cap portion of the hat stringer when the cover is coupled against a closeout portion of the hat stringer. The closeout fitting also includes an insert. The insert includes a first outer perimeter surface that is substantially complementary to at least a portion of an interior surface of a channel defined by the hat stringer. The insert is configured to couple against the channel interior surface proximate the hat stringer closeout portion. The insert and the cover are formed with a suitable stiffness to limit a deformation of the hat stringer proximate the closeout portion when the closeout fitting is coupled to the closeout portion.

In another aspect, an aircraft is provided. The aircraft includes a wing and a hat stringer coupled to an interior surface of a panel of the wing. The hat stringer defines a channel. The hat stringer includes a cap portion. A gap is defined in the cap portion proximate a closeout portion of the hat stringer. The aircraft also includes a closeout fitting. The closeout fitting includes a cover coupled against an outer surface of the hat stringer. A fitting surface of the cover is substantially complementary to at least a portion of the hat stringer outer surface, and a first portion of the cover extends across the gap. The closeout fitting also includes an insert coupled against an interior surface of the channel proximate the hat stringer closeout portion. A first outer perimeter surface of the insert is substantially complementary to at least a portion of the channel interior surface. The insert and the cover are formed with a suitable stiffness to limit a deformation of the hat stringer proximate the closeout portion.

In another aspect, a method of making a closeout fitting for a hat stringer of a vehicle is provided. The method includes forming a fitting surface of a cover to be substantially complementary to at least a portion of an outer surface of the hat stringer, such that the cover is configured to couple against the hat stringer outer surface. The method also includes configuring a first portion of the cover to extend across a gap defined in a cap portion of the hat stringer when the cover is coupled against a closeout portion of the hat stringer. The method further includes forming a first outer perimeter surface of an insert to be substantially complementary to at least a portion of an interior surface of a channel defined by the hat stringer, such that the insert is configured to couple against the channel interior surface proximate the hat stringer closeout portion. The insert and the cover are configured for coupling to the hat stringer closeout portion, and the insert and the cover are formed with a suitable stiffness to limit a deformation of the hat stringer proximate the closeout portion when the closeout fitting is coupled to the closeout portion.

BRIEF DESCRIPTION OF THE DRAWINGS

FIG. 2 is a schematic perspective view of an exemplary embodiment of a hat stringer that may be used on the exemplary aircraft shown in FIG. 1:

FIG. 3 is a schematic cross-sectional view of the exemplary hat stringer shown in FIG. 2;

FIG. 4 is a schematic exploded perspective view of an exemplary embodiment of a hat stringer closeout fitting that may be used with the hat stringer shown in FIG. 2 and the aircraft shown in FIG. 1;

FIG. 5 is a schematic perspective view of the exemplary hat stringer closeout fitting shown in FIG. 4 coupled to the hat stringer shown in FIG. 2;

FIG. 6 is a schematic perspective view of a portion of a side-of-body joint of the exemplary aircraft shown in FIG. 1, with the exemplary hat stringer shown in FIG. 2 coupled to a wing of the exemplary aircraft and the exemplary hat stringer closeout fitting shown in FIG. 4 coupled to the exemplary hat stringer.

DETAILED DESCRIPTION

Embodiments of the system and method described herein provide a closeout fitting for a hat stringer closeout portion, such as a closeout portion defined by a run-out trim. The closeout fitting improves a capability of the hat stringer at the trimmed location to carry loads to which the hat stringer is subjected. In certain embodiments, the closeout fitting additionally includes a vent connector configured to couple a channel defined by the hat stringer in flow communication with a vent system.

Figure 1:
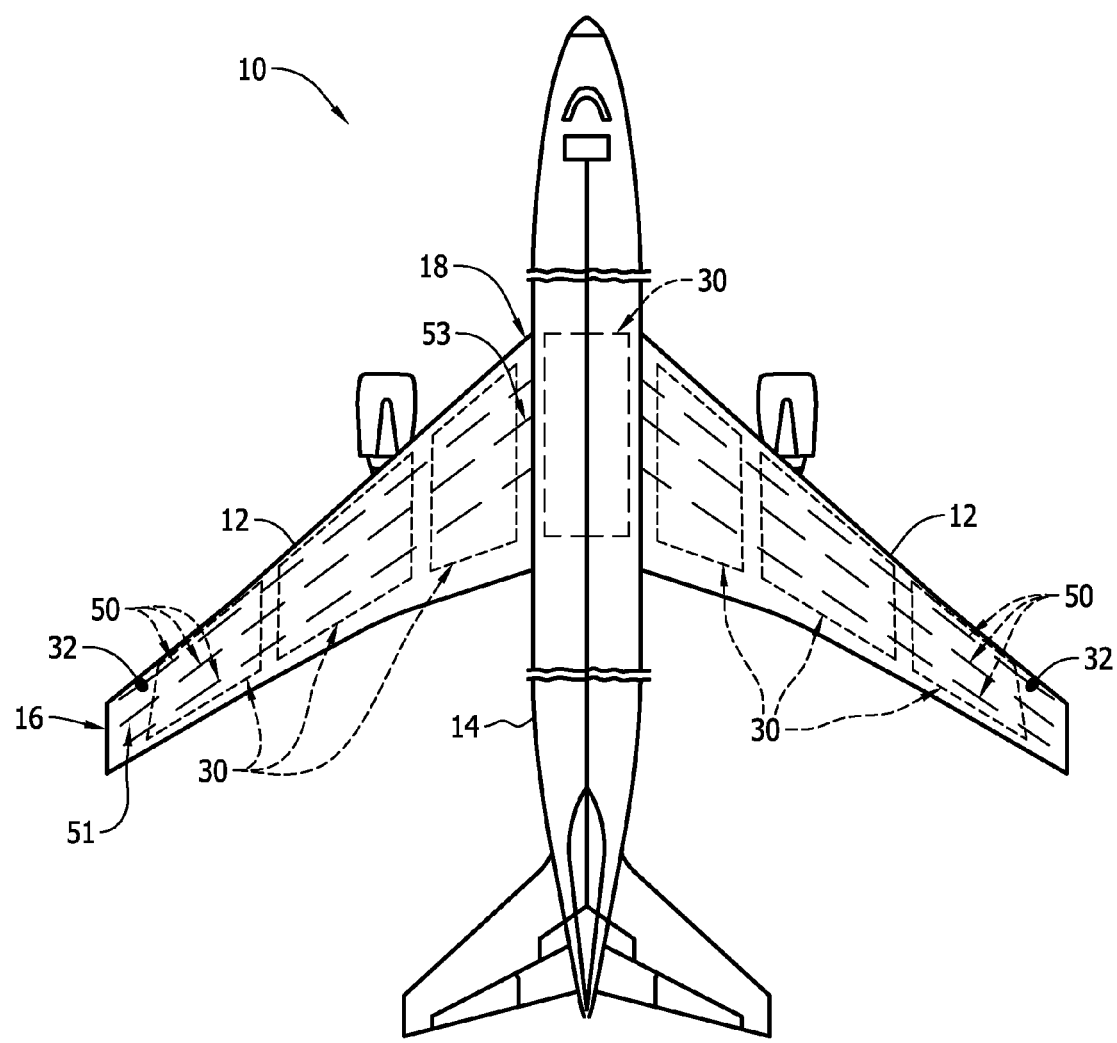
FIG. 1 is a schematic diagram of an exemplary aircraft on which embodiments of a hat stringer closeout fitting may be used.

Referring more particularly to the drawings, implementations of the disclosure may be described in the context of a structure such as an exemplary aircraft 10 shown schematically in FIG. 1. Various components of aircraft 10, such as, but not limited to, wings 12 and fuselage 14, are formed from structural components that include at least one hat stringer 50. It should be understood, however, that the disclosure applies equally to other vehicles, including but not limited to automobiles, heavy work vehicles, aquatic vessels, and other vehicles.

In the illustrated embodiment, for example, at least one hat stringer 50 is disposed along an interior of each wing 12. Each hat stringer 50 extends from a first end 51 to a second end 53. In the illustrated embodiment, each first end 51 is located near a tip 16 of wing 12, and each second end 53 is located near a root 18 of wing 12. In alternative embodiments, at least one of first end 51 and second end 53 are located at a different location along wing 12 for at least one of the at least one hat stringers 50.

Also in the illustrated embodiment, at least one fuel tank 30 is disposed in an interior of each wing 12. Additionally or alternatively, at least one fuel tank 30 is disposed in an interior of fuselage 14. Each fuel tank 30 is in flow communication with at least one vent 32 of aircraft 10. The at least one vent 32 facilitates reducing a pressure difference between an interior of each fuel tank 30 and an atmospheric pressure.

FIG. 2 is a schematic perspective view of an exemplary embodiment of hat stringer 50, and FIG. 3 is a schematic cross-sectional view of exemplary hat stringer 50 taken along line 3-3 shown in FIG. 2. With reference to FIGS. 2 and 3, hat stringer 50 includes a pair of opposing flange portions 52, a pair of opposing web portions 54, and a cap portion 56 that extends between web portions 54. Each web portion 54 extends between one of the pair of flange portions 52 and an edge of cap portion 56. In an embodiment, hat stringer 50 is formed from a carbon fiber reinforced polymer material. In alternative embodiments, hat stringer 50 is formed from any other suitable material that enables hat stringer 50 to function as described herein.

In the illustrated embodiment, hat stringer 50 is coupled to a surface 42 of a panel 40. For example, panel 40 is a skin panel of wing 12 (shown in FIG. 1), and surface 42 is an interior surface of the skin panel. More specifically, each flange portion 52 of hat stringer 50 is coupled to surface 42 in any suitable fashion, such as but not limited to by an adhesive or co-bonding, that enables hat stringer 50 to function as described herein. A noodle 58 also is coupled in any suitable fashion between surface 42 and hat stringer 50 at each location where one of the flange portions 52 transitions into one of the web portions 54. In alternative embodiments, noodles 58 are not present.

Web portions 54, cap portion 56, panel 40, and, if present, noodles 58 cooperate to define a channel 60 having an interior surface 70. In the illustrated embodiment, channel interior surface 70 has a generally trapezoidal cross-section. In alternative embodiments, channel interior surface 70 has a cross-section that is other than generally trapezoidal. In addition, web portions 54 and cap portion 56 cooperate to define an outer surface 72 of hat stringer 50.

In certain embodiments, channel 60 is configured to be in flow communication with a venting system. For example, channel 60 is configured to be in flow communication with at least one fuel tank 30 and at least one vent 32 of aircraft 10 (shown in FIG. 1) to facilitate reducing a pressure difference between an interior of the at least one fuel tank 30 and an atmospheric pressure. In alternative embodiments, channel 60 is not configured to be in flow communication with a venting system.

With reference to FIG. 2, in the illustrated embodiment, a run-out trim 62 of hat stringer 50 is defined proximate to one of first end 51 and second end 53 of hat stringer 50. More specifically, run-out trim 62 is defined by a region in which material has been trimmed from hat stringer 50 along an edge 64 of each web portion 54 and along an edge 66 of cap portion 56. In certain embodiments, a shape and location of edges 64 and 66 is predetermined to accommodate a structural fitting of panel 40 with another structural component. For example, panel 40 is a skin panel of wing 12 (shown in FIG. 1), and end 44 is proximate root 18 (shown in FIG. 1) and configured to be coupled to fuselage 14 via a structural joint, such as joint 90 (shown in FIG. 6).

A gap 69 is defined in hat stringer cap portion 56 between opposing web portion edges 64 and between opposing portions of cap edge 66. A closeout portion 68 of hat stringer 50 is defined proximate gap 69. A first end 61 of channel 60 is defined adjacent closeout portion 68.

A plurality of first closeout openings 76 are defined in, and extend through, opposing web portions 54 of hat stringer closeout portion 68. In alternative embodiments, plurality of first closeout openings 76 additionally or alternatively are defined in, and extend through, cap portion 56 of closeout portion 68. In other alternative embodiments, plurality of first closeout openings 76 are not defined in any of web portions 54 and cap portion 56. Also in the illustrated embodiment, a plurality of second closeout openings 78 are defined in, and extend through, opposing web portions 54 and cap portion 56 of closeout portion 68. In alternative embodiments, plurality of second closeout openings 78 are not defined in at least one of web portions 54 and cap portion 56. Plurality of first closeout openings 76 and plurality of second closeout openings 78 are configured for coupling closeout portion 68 to a closeout fitting 100 (shown in FIGS. 4 and 5), as will be described herein.

FIG. 4 is a schematic exploded perspective view of an exemplary embodiment of closeout fitting 100. FIG. 5 is a schematic perspective view of exemplary closeout fitting 100 coupled to hat stringer closeout portion 68. With reference to FIGS. 4 and 5, closeout fitting 100 includes an insert 102 and a cover 130. Insert 102 and cover 130 are configured to couple to closeout portion 68 such that insert 102 and cover 130 provide a structural path for reacting loads to which hat stringer 50 is subjected. In certain embodiments, insert 102 and cover 130 are formed with a suitable stiffness to limit a deformation of hat stringer 50 proximate closeout portion 68 when closeout fitting 100 is coupled to closeout portion 68. For example, insert 102 and cover 130 are formed with a suitable stiffness to limit a torsional and/or bending deformation in web portions 54 proximate closeout portion 68. For another example, insert 102 and cover 130 are formed with a suitable stiffness to limit a deformation from shear loads in hat stringer cap portion 56 proximate cap portion edge 66. In an embodiment, insert 102 and cover 130 are formed from a metallic material. In alternative embodiments, insert 102 and cover 130 are formed from any suitable material that enables closeout fitting 100 to function as described herein.

Cover 130 defines a fitting surface 134 that is substantially complementary to at least a portion of hat stringer outer surface 72, such that cover 130 is configured to couple against outer surface 72. In the illustrated embodiment, cover 130 includes a pair of opposing sides 136 that are each substantially complementary to an outer surface of at least a portion of a respective hat stringer web portion 54, and a cap 140 that is substantially complementary to an outer surface of hat stringer cap portion 56. Cover 130 includes at least a first portion 132 configured to extend across gap 69 when cover 130 is coupled against hat stringer outer surface 72 at closeout portion 68.

In the illustrated embodiment, a plurality of first cover openings 144 are defined in, and extend through, cover 130. Each first cover opening 144 is configured to align with a corresponding first closeout opening 76 (shown in FIG. 2) when cover 130 is positioned for coupling to closeout portion 68. In the illustrated embodiment, first cover openings are defined in each opposing cover side 136. In alternative embodiments, plurality of first cover openings 144 additionally or alternatively are defined in, and extend through, cover cap 140. In other alternative embodiments, first cover openings 144 are not defined in cover 130.

Also in the illustrated embodiment, a plurality of second cover openings 154 are defined in, and extend through, cover 130. Each second cover opening 154 is configured to align with a corresponding second closeout opening 78 (shown in FIG. 2) when cover 130 is positioned for coupling to closeout portion 68. In the illustrated embodiment, second cover openings 154 are defined in each opposing cover side 136 and cover cap 140. In alternative embodiments, second cover openings 154 are not defined in at least one of opposing cover sides 136 and cover cap 140. When closeout fitting 100 is assembled, a suitable second fastener 168 is disposed in each corresponding aligned second closeout opening 78 and second cover opening 154 to couple cover 130 to closeout portion 68. In alternative embodiments, second cover openings 154 are not defined in cover 130, and insert 102 and cover 130 are coupled to closeout portion 68 in another suitable fashion, such as but not limited to by at least one first fastener 170 (as will be described herein) or by an adhesive.

Further in the illustrated embodiment, a plurality of third cover openings 148 are defined in, and extend through, cover cap 140. Each third cover opening 148 is configured to be positioned proximate gap 69 (shown in FIG. 2) when cover 130 is positioned for coupling to closeout portion 68. Moreover, each third cover opening 148 is configured to align with a corresponding third insert opening 116 in insert 102, as will be described herein, when cover 130 and insert 102 are positioned for coupling to closeout portion 68. In alternative embodiments, third cover openings 148 are additionally or alternatively are defined in, and extend through, opposing cover sides 136. In other alternative embodiments, third cover openings 148 are not defined in any of opposing cover sides 136 and cover cap 140.

In certain embodiments, cover 130 includes a vent connector 160. In the illustrated embodiment, vent connector 160 extends from cover cap 140. Vent connector 160 defines an orifice 162 that extends through cover cap 140 such that vent connector 160 is configured to be in flow communication with channel 60 via gap 69 when cover 130 is positioned for coupling to closeout portion 68. A rim 164 of vent connector 160 is configured for coupling to a vent tube 80 (shown in FIG. 6) in any suitable fashion, such as but not limited to by a threaded connection. In certain embodiments, vent tube 80 is in flow communication with at least one of plurality of fuel tanks 30 of aircraft 10, such that channel 60 provides a conduit between the at least one fuel tank 30 and at least one vent 32 of aircraft 10. In alternative embodiments, cover 130 does not include vent connector 160, and closeout fitting 100 is not configured to couple channel 60 to a vent system.

Insert 102 is configured to be positioned at channel first end 61 when closeout fitting 100 is positioned for coupling to closeout portion 68. Insert 102 defines a first outer perimeter surface 103 that is substantially complementary to at least a portion of channel interior surface 70 (shown in FIG. 3), such that insert 102 is configured to couple against channel interior surface 70 proximate closeout portion 68. Moreover, in certain embodiments, insert 102 defines a second outer perimeter surface 105 that is substantially complementary to at least a portion of fitting surface 134 of cover 130.

For example, in the illustrated embodiment, insert 102 includes a pair of opposing sides 106, a cap end 110, and a panel end 112 opposite cap end 110. First outer perimeter surface 103 is defined by opposing insert sides 106 that are each substantially complementary to an inner surface of a respective hat stringer web portion 54, and insert panel end 112 that is substantially complementary to a portion of panel surface 42 that extends between web portions 54. Insert panel end 112 also is substantially complementary to a surface of noodles 58, if present. Also in the illustrated embodiment, second outer perimeter surface 105 is defined by insert cap end 110. Insert cap end 110 is configured to be positioned proximate gap 69 when insert 102 is positioned for coupling to closeout portion 68, and insert cap end 110 is substantially complementary to fitting surface 134 of first portion 132 of cover 130.

In an alternative embodiment (not shown), first outer perimeter surface 103 also is partially defined by insert cap end 110. For example, insert cap end 110 is configured to be positioned proximate hat stringer cap portion 56 when insert 110 is positioned for coupling to closeout portion 68, and insert cap end 110 is substantially complementary to an inner surface of cap portion 56.

In certain embodiments, insert 102 is configured to block flow communication through first end 61 of channel 60 when insert 102 is coupled to closeout portion 68 (shown in FIG. 2). For example, in certain embodiments, insert 102 includes a wall 118 that is sealingly enclosed by first outer perimeter surface 103 and second outer perimeter surface 105. In the illustrated embodiment, wall 118 extends between opposing insert sides 106 and extends between insert cap end 110 and insert panel end 112. In alternative embodiments, wall 118 is sealingly enclosed substantially entirely by first outer perimeter surface 103.

A plurality of first insert openings 114 are defined in, and extend through, first outer perimeter surface 103. Each first insert opening 114 is configured to align with a corresponding first closeout opening 76 and a corresponding first cover opening 144 when insert 102 and cover 130 are positioned for coupling to closeout portion 68. In the illustrated embodiment, first insert openings 114 are defined in each opposing insert side 106. In alternative embodiments, plurality of first insert openings 114 additionally or alternatively are defined in, and extend through, insert cap end 110. When closeout fitting 100 is assembled, a suitable first fastener 170 is disposed in each corresponding aligned first insert opening 114, first closeout opening 76, and first cover opening 144 to couple insert 102 and cover 130 to closeout portion 68. In alternative embodiments, first insert openings 114 are not defined in first outer perimeter surface 103, and insert 102 and cover 130 are coupled to closeout portion 68 in another suitable fashion, such as but not limited to by second fasteners 168 and third fasteners 172 (as will be described herein) or by an adhesive.

Also in the illustrated embodiment, a plurality of third insert openings 116 are defined in, and extend through, second outer perimeter surface 105. Plurality of third insert openings 116 are configured to be positioned proximate gap 69 (shown in FIG. 2) when insert 102 is positioned for coupling to closeout portion 68. Moreover, each third insert opening 116 is configured to align with a corresponding third cover opening 148 when cover 130 and insert 102 are positioned for coupling to closeout portion 68. In the illustrated embodiment, third insert openings 116 are defined in insert cap end 110. In alternative embodiments, third insert openings 116 additionally or alternatively are defined in, and extend through, opposing insert sides 106. When closeout fitting 100 is assembled, a suitable third fastener 172 is disposed in each corresponding aligned third insert opening 116 and third cover opening 148 to couple insert 102 to cover 130, and thus, indirectly, to closeout portion 68. In other alternative embodiments, third insert openings 116 are not defined in second outer perimeter surface 105, and insert 102 is coupled to cover 130 in another suitable fashion, such as but not limited to by first fasteners 170 and/or by an adhesive.

In certain embodiments, aligned first insert openings 114 and first cover openings 144, as well as aligned third insert openings 116 and third cover openings 148, are fully accessible externally to closeout fitting 100 to enable installation of corresponding first fasteners 170 and third fasteners 172. For example, in the illustrated embodiment, each of first outer perimeter surface 103 and second outer perimeter surface 105 extends from a first end 120 to a second end 122, with second end 122 configured to face channel 60 when closeout fitting 100 is coupled to hat stringer 50. Wall 118 is positioned proximate second end 122 such that, when cover 130 and insert 102 are positioned for coupling to closeout portion 68 and corresponding first fasteners 170 and third fasteners 172 are inserted, both ends of each first fastener 170 and each third fastener 172 are accessible externally to closeout fitting 100 to facilitate completion of the coupling process. Thus, each of first fasteners 170 and third fasteners 172 can be installed without a need for access to an interior of hat stringer 50. In alternative embodiments, at least one of aligned first insert openings 114 and first cover openings 144 and aligned third insert openings 116 and third cover openings 148 are not fully accessible externally to closeout fitting 100 to enable installation of corresponding first fasteners 170 and third fasteners 172, and the corresponding first fasteners 170 and third fasteners 172 are installed by, for example, accessing a second end of the fasteners through orifice 162.

As described above, insert 102 is configured in certain embodiments to substantially block flow communication through channel first end 61 (shown in FIG. 2) when closeout fitting 100 is coupled to closeout portion 68. In particular embodiments, a suitable sealant material is positioned between insert 102 and at least one of closeout portion 68 and cover 130 to improve a sealing effectiveness of insert 102 at channel first end 61. For example, the sealant material is positioned at an interface between insert 102 and at least one of hat stringer web portion edges 64 and cover first portion 132. In alternative embodiments, no sealant material is positioned between insert 102 and either of closeout portion 68 and cover 130.

FIG. 6 is a schematic perspective view of a portion of a side-of-body joint 90 coupling wing 12 and fuselage 14 of aircraft 10, with hat stringer 50 coupled to wing 12 and closeout fitting 100 coupled to hat stringer 50. In the illustrated embodiment, panel 40 is an upper wing skin panel, and surface 42 is an interior surface of panel 40. Thus, as illustrated in FIG. 6, hat stringer outer surface 72 extends downward from surface 42. Joint 90 includes at least one structural fitting 92 that couples hat stringer 50 to fuselage 14. In the illustrated embodiment, the at least one structural fitting 92 includes a pair of structural fitting web portions 94, and each structural fitting web portion 94 is coupled to a corresponding hat stringer flange portion 52 and web portion 54 in any suitable fashion, such as but not limited to using suitable fasteners (not shown).

In the illustrated embodiment, hat stringer channel 60 is coupled in flow communication with at least one fuel tank 30 (shown in FIG. 1) and at least one vent 32 (shown in FIG. 1) of aircraft 10. More specifically, a first end 82 of vent tube 80 is coupled in flow communication with closeout fitting vent connector 160, and a second end 84 of vent tube 80 is coupled in flow communication with a vent port 86 of fuselage 14. Vent port 86 is in flow communication with at least one fuel tank 30 located in an interior of fuselage 14. Thus, a fluid flow path is defined from the at least one fuel tank 30, through vent port 86, through vent tube 80, through closeout fitting vent connector 160, through gap 69 (shown in FIG. 2), through channel 60 (shown in FIG. 2), to the at least one vent 32. Moreover, the flow path is at least partially defined at channel first end 61 by insert 102 (visible in FIG. 5) of closeout fitting 100. In an alternative embodiment, closeout fitting 100 does not include vent connector 160, and hat stringer channel 60 is not coupled in flow communication with any fuel tank 30 and/or any vent 32.

Figure 7:
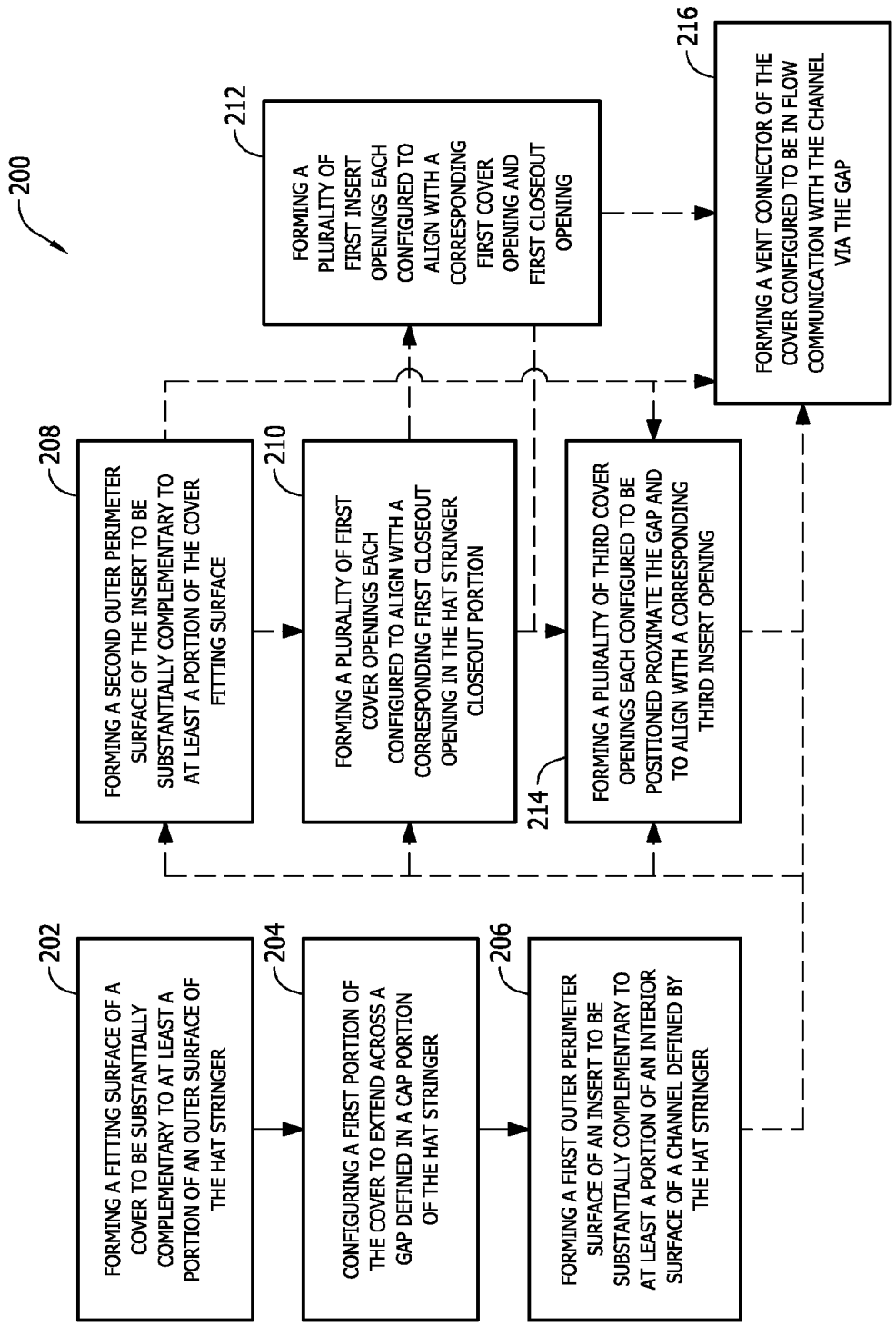
FIG. 7 is a flowchart of an embodiment of a method of making a closeout fitting for a hat stringer, such as the exemplary hat stringer closeout fitting shown in FIG. 4.

FIG. 7 is a flowchart of an embodiment of a method 200 of making a closeout fitting, such as closeout fitting 100, for a hat stringer, such as hat stringer 50, of a vehicle, such as aircraft 10. Method 200 includes forming 202 a fitting surface of a cover, such as fitting surface 134 of cover 130, to be substantially complementary to at least a portion of an outer surface, such as outer surface 72, of the hat stringer, such that the cover is configured to couple against the hat stringer outer surface. Method 200 also includes configuring 204 a first portion, such as first portion 132, of the cover to extend across a gap defined in a cap portion, such as gap 69 defined in cap portion 56, of the hat stringer when the cover is coupled against a closeout portion, such as closeout portion 68, of the hat stringer. Method 200 further includes forming 206 a first outer perimeter surface of an insert, such as first perimeter outer surface 103 of insert 102, to be substantially complementary to at least a portion of an interior surface of a channel defined by the hat stringer, such as interior surface 70 of channel 60, such that the insert is configured to couple against the channel interior surface proximate the hat stringer closeout portion. The insert and the cover are formed with a suitable stiffness to limit a deformation of the hat stringer proximate the closeout portion when the closeout fitting is coupled to the closeout portion.

In certain embodiments, method 200 includes forming 208 a second outer perimeter surface of the insert, such as second outer perimeter surface 105, to be substantially complementary to at least a portion of the cover fitting surface. In some embodiments, method 200 also includes forming 210 a plurality of first cover openings, such as first cover openings 144, in the cover. Each first cover opening extends through the cover, and each first cover opening is configured to align with a corresponding one of a plurality of first closeout openings, such as first closeout openings 76, defined in the hat stringer closeout portion when the cover is positioned for coupling to the hat stringer closeout portion. Also in some embodiments, method 200 includes forming 212 a plurality of first insert openings, such as first insert openings 114, in the first outer perimeter surface. Each first insert opening extends through the first outer perimeter surface, and each first insert opening is configured to align with a corresponding one of the plurality of first cover openings and a corresponding one of the plurality of first closeout openings when the insert and the cover are positioned for coupling to the hat stringer closeout portion.

Additionally, in certain embodiments, method 200 includes forming 214 a plurality of third cover openings, such as third cover openings 148, in the cover. Each third cover opening extends through the cover, and each third cover opening is configured to be positioned proximate the gap when the cover is positioned for coupling to the hat stringer closeout portion. Each third cover opening is configured to align with a corresponding one of a plurality of third insert openings, such as third insert openings 116, defined in the insert when the cover and the insert are positioned for coupling to the hat stringer closeout portion. In some embodiments, method 200 includes forming 216 a vent connector, such as vent connector 160, of the cover. The vent connector defines an orifice, such as orifice 162, that extends through the cover such that the vent connector is configured to be in flow communication with the channel via the gap when the cover is positioned for coupling to the hat stringer closeout portion.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a closeout fitting for a hat stringer closeout portion, such as a closeout portion defined by a run-out trim. The embodiments improve a capability of the hat stringer at the trimmed location to carry loads to which the hat stringer is subjected. Certain embodiments additionally provide a vent connector configured to couple a channel defined by the hat stringer in flow communication with a vent system.

The embodiments described herein provide improvements over at least some structures that include hat stringer run-out trims. As compared to at least some known structures, the closeout fitting described herein reduces or eliminates adverse structural effects proximate a hat stringer run-out trim such as, but not limited to, excessive hat stringer web bending and excessive localized loads on the hat stringer noodle, such as bending, torsion, shear, axial, vertical, and/or transverse localized noodle loads. In addition, in certain embodiments, the closeout fitting includes a vent connector that eliminates a need for an additional hole in the hat stringer to couple a channel defined by the hat stringer in flow communication with a vent system. Moreover, the closeout fitting can be coupled to the hat stringer closeout portion, and additionally a simple vent system connection can established, prior to initiation of a larger coupling process involving the associated structure, such as a wing-to-fuselage coupling process. Thus, the embodiments described herein facilitate reducing a number of tasks associated with a critical stage in an overall manufacturing process.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A closeout fitting for a hat stringer, said closeout fitting comprising:
   a cover comprising:
      a fitting surface, said fitting surface is substantially complementary to at least a portion of an outer surface of the hat stringer, wherein said cover is configured to couple against said hat stringer outer surface; and
      a first portion configured to extend across a gap defined in a cap portion of the hat stringer when said cover is coupled against a closeout portion of the hat stringer; and
   an insert comprising an outer perimeter surface and a wall that is sealingly enclosed by said outer perimeter surface, wherein at least a first portion of said outer perimeter surface is substantially complementary to at least a portion of an interior surface of a channel defined by the hat stringer, said insert is configured to couple to said cover and to couple against the channel interior surface proximate the hat stringer closeout portion such that said wall is disposed across the channel and such that a deformation of the hat stringer proximate the closeout portion is limited, and wherein said insert is configured to substantially block flow communication through the channel.

2. The closeout fitting according to claim 1, wherein at least a second portion of said outer perimeter surface is substantially complementary to at least a portion of said cover fitting surface.

3. The closeout fitting according to claim 1, wherein said cover further comprises a plurality of first cover openings defined in and extending through said cover, and said insert further comprises a plurality of first insert openings defined in and extending through said outer perimeter surface, each said first cover opening is configured to align with a corresponding said first insert opening and a corresponding one of a plurality of first closeout openings defined in the hat stringer closeout portion when said cover is positioned for coupling to the hat stringer closeout portion.

4. The closeout fitting according to claim 1, wherein said cover further comprises a plurality of third cover openings defined in and extending through said cover, each said third cover opening is configured to be positioned proximate the gap when said cover is positioned for coupling to the hat stringer closeout portion, each said third cover opening is configured to align with a corresponding one of a plurality of third insert openings defined in said insert when said cover and said insert are positioned for coupling to the hat stringer closeout portion.

5. The closeout fitting according to claim 1, wherein said cover further comprises a vent connector, said vent connector defines an orifice that extends through said cover such that said vent connector is configured to be in flow communication with the channel via the gap when said cover is positioned for coupling to the hat stringer closeout portion.

6. An aircraft comprising:
   a wing;
   a hat stringer coupled to an interior surface of a panel of said wing, said hat stringer defines a channel, said hat stringer comprises a cap portion, wherein a gap is defined in said cap portion proximate a closeout portion of said hat stringer; and a closeout fitting comprising:
  a cover coupled against an outer surface of said hat stringer, wherein a fitting surface of said cover is substantially complementary to at least a portion of said hat stringer outer surface, and wherein a first portion of said cover extends across said gap; and
  an insert comprising an outer perimeter surface and a wall that is sealingly enclosed by said outer perimeter surface, wherein at least a first portion of said outer perimeter surface of said insert is substantially complementary to at least a portion of said channel interior surface, said insert is coupled to said cover and coupled against said channel interior surface proximate said closeout portion such that said wall is disposed across said channel and such that a deformation of said hat stringer proximate said closeout portion is limited, and wherein said insert is configured to substantially block flow communication through said channel.

7. The aircraft according to claim 6, wherein at least a second portion of said outer perimeter surface is substantially complementary to at least a portion of said cover fitting surface.

8. The aircraft according to claim 6, wherein said cover further comprises a plurality of first cover openings defined in and extending through said cover, and said insert further comprises a plurality of first insert openings defined in and extending through said outer perimeter surface, each said first cover opening is aligned with a corresponding said first insert opening and a corresponding one of a plurality of first closeout openings defined in said hat stringer closeout portion.

9. The aircraft according to claim 6, wherein said cover further comprises a plurality of third cover openings defined in and extending through said cover, each said third cover opening is positioned proximate said gap, each said third cover opening is aligned with a corresponding one of a plurality of third insert openings defined in said insert.

10. The aircraft according to claim 6, wherein said cover further comprises a vent connector, said vent connector defines an orifice that extends through said cover such that said vent connector is in flow communication with said channel via said gap.

11. The aircraft according to claim 10, further comprising:
  at least one vent coupled in flow communication with said channel; and
  at least one fuel tank in flow communication with said vent connector, such that a fluid flow path is defined from said at least one fuel tank, through said vent connector, through said gap, through said channel, to said at least one vent.

12. The aircraft according to claim 11, further comprising:
  a fuselage comprising a vent port, said at least one fuel tank is disposed in an interior of said fuselage, said at least one fuel tank is in flow communication with said vent port; and
  a vent tube, wherein a first end of said vent tube is coupled in flow communication with said vent connector and a second end of said vent tube is coupled in flow communication with said vent port, such that said fluid flow path is defined from said at least one fuel tank, through said vent port, through said vent tube, through said vent connector, through said gap, through said channel, to said at least one vent.

13. A method of making a closeout fitting for a hat stringer of a vehicle, said method comprising:
  forming a fitting surface of a cover to be substantially complementary to at least a portion of an outer surface of the hat stringer, such that the cover is configured to couple against the hat stringer outer surface;
  configuring a first portion of the cover to extend across a gap defined in a cap portion of the hat stringer when the cover is coupled against a closeout portion of the hat stringer; and
  forming an insert that includes an outer perimeter surface and a wall that is sealingly enclosed by the outer perimeter surface, wherein at least a first portion of the outer perimeter surface is substantially complementary to at least a portion of an interior surface of a channel defined by the hat stringer, such that the insert is configured to couple to the cover and to couple against the channel interior surface proximate the hat stringer closeout portion such that the wall is disposed across the channel and such that a deformation of the hat stringer proximate the closeout portion is limited, and wherein forming the insert further comprises configuring the insert to substantially block flow communication through the channel.

14. The method according to claim 13, further comprising forming at least a second portion of the outer perimeter surface of the insert to be substantially complementary to at least a portion of the cover fitting surface.

15. The method according to claim 13, further comprising forming a plurality of first cover openings in the cover and a plurality of first insert openings in the outer perimeter surface, wherein each first cover opening extends through the cover and each first insert opening extends through the outer perimeter surface, each first cover opening is configured to align with a corresponding first insert opening and a corresponding one of a plurality of first closeout openings defined in the hat stringer closeout portion when the cover is positioned for coupling to the hat stringer closeout portion.

16. The method according to claim 13, further comprising forming a plurality of third cover openings in the cover, wherein each third cover opening extends through the cover, each third cover opening is configured to be positioned proximate the gap when the cover is positioned for coupling to the hat stringer closeout portion, and each third cover opening is configured to align with a corresponding one of a plurality of third insert openings defined in the insert when the cover and the insert are positioned for coupling to the hat stringer closeout portion.

17. The method according to claim 13, further comprising forming a vent connector of the cover, wherein the vent connector defines an orifice that extends through the cover such that the vent connector is configured to be in flow communication with the channel via the gap when the cover is positioned for coupling to the hat stringer closeout portion.

* * * * *